(12) United States Patent
Foxlin

(10) Patent No.: US 9,588,214 B2
(45) Date of Patent: Mar. 7, 2017

(54) SENSING DIRECTION AND DISTANCE

(75) Inventor: Eric Foxlin, Lexington, MA (US)

(73) Assignee: THALES VISIONIX, INC., Clarksburg, MD (US)

( * ) Notice: Subject to any disclaimer, the term of this patent is extended or adjusted under 35 U.S.C. 154(b) by 841 days.

(21) Appl. No.: 13/559,332

(22) Filed: Jul. 26, 2012

(65) Prior Publication Data

US 2015/0301153 A1    Oct. 22, 2015

Related U.S. Application Data

(60) Provisional application No. 61/511,811, filed on Jul. 26, 2011.

(51) Int. Cl.
| | | |
|---|---|---|
| *G06K 19/00* | (2006.01) | |
| *G01S 3/783* | (2006.01) | |
| *G01S 5/16* | (2006.01) | |

(52) U.S. Cl.
CPC ............ *G01S 3/7835* (2013.01); *G01S 5/163* (2013.01)

(58) Field of Classification Search
USPC ........................................ 235/435, 439, 454
See application file for complete search history.

(56) References Cited

U.S. PATENT DOCUMENTS

| | | |
|---|---|---|
| 3,678,283 A | 7/1972 | LaBaw |
| H192 H | 1/1987 | Daehler |
| 4,722,601 A | 2/1988 | McFarlane |
| 5,009,501 A | 4/1991 | Fenner et al. |
| 5,196,689 A | 3/1993 | Sugita et al. |
| 5,510,893 A | 4/1996 | Suzuki |
| 6,141,081 A * | 10/2000 | Das ................ G03F 7/70358 250/492.1 |
| 6,922,632 B2 | 7/2005 | Foxlin |
| 2002/0163641 A1* | 11/2002 | Shroder ..................... 356/419 |
| 2004/0149036 A1 | 8/2004 | Foxlin et al. |
| 2008/0034866 A1* | 2/2008 | Kilic et al. ............... 73/514.26 |
| 2010/0109976 A1 | 5/2010 | Gilbert et al. |
| 2011/0273722 A1 | 11/2011 | Charny et al. |
| 2011/0317084 A1* | 12/2011 | Lee et al. ..................... 349/15 |
| 2012/0001071 A1 | 1/2012 | Snider et al. |

FOREIGN PATENT DOCUMENTS

WO    WO 2010/084222 A1    7/2010

OTHER PUBLICATIONS

International Search Report and Written Opinion mailed Apr. 1, 2015 for corresponding International Application No. PCT/US2014/028068.
Extended European Search Report of related European Patent Application No. 14765624.3 dated Jan. 11, 2017.

* cited by examiner

*Primary Examiner* — Matthew Mikels
(74) *Attorney, Agent, or Firm* — Arent Fox LLP

(57) ABSTRACT

Technology described in this document can be embodied in an optical sensor that includes a rectangular array of at least four photodetector cells of substantially equal size. An opaque mask is affixed over the rectangular array. The opaque mask defines a substantially rectangular aperture for admitting light onto only a portion of the surface of each of the at least four photodetector cells, where the aperture can be centrally positioned over the rectangular array.

27 Claims, 5 Drawing Sheets

SENSING DIRECTION AND DISTANCE

CROSS-REFERENCE TO RELATED APPLICATIONS

This application claims priority to U.S. Provisional Application Ser. No. 61/511,811 filed Jul. 26, 2011, the entire content of which is incorporated herein by reference.

BACKGROUND

In the field of motion tracking (also known as position tracking, position and orientation tracking, or pose tracking), six types of sensors are commonly employed: mechanical, acoustic, optical, magnetic, inertial, and radio-frequency (RF) sensors. Mechanical systems are generally avoided due to encumbrance of the person or object being tracked. For indoor precision applications, RF is generally not suitable due to coarse resolution and/or multipath interference. Similarly, use of magnetic systems has been declining due to difficulties with magnetic field distortion around metallic objects, and limited range. Motion tracking systems can be based on optical and/or acoustic sensors, which can also be used in combination with inertial sensors.

In acoustic tracking systems, the fundamental measurement can be a 1-degree of freedom (DOF) time-of-flight range measurement between an emitter and a receiver. The tracking system can determine object position by using multi-lateration of three or more range measurements between a single emitter (receiver) and multiple receivers (emitters).

In optical tracking systems, the fundamental measurement can be a 2-DOF bearing-angle measurement from a camera to a target (e.g., a light emitting diode (LED), reflector, marker, or object feature). To determine an object position in an "outside-in" system, two or more such bearing-angle measurements from separated cameras are combined with triangulation. In an "inside-out" system, one camera can observe four or more separated targets, which are used to solve a perspective-n-point (PnP) pose recovery algorithm.

SUMMARY

In one aspect, an optical sensor includes a rectangular array of at least four photodetector cells of substantially equal size. An opaque mask can be affixed over the rectangular array. The opaque mask defines a substantially rectangular aperture for admitting light onto only a portion of the surface of each of the at least four photodetector cells, where the aperture can be centrally positioned over the rectangular array.

In another aspect, a method for determining the direction of a point-source-like emitter of light includes providing a rectangular array of at least four photodetector cells of substantially equal size and an opaque mask affixed over the rectangular array. The opaque mask can define a substantially rectangular aperture for admitting light onto only a portion of the surface of each of the at least four photodetector cells, where the aperture can be centrally positioned over the rectangular array. The method further includes analyzing the intensity of light received on the rectangular array from the point-source-like emitter.

In another aspect, a tracking system includes a transmitting unit and a receiving unit. The transmitting unit includes an optical emitter, and the receiving unit includes an optical sensor adapted to receive signals from the optical emitter. The system also includes an acoustic emitter mounted on the transmitting unit or the receiving unit. The system further includes an acoustic receiver mount on a different one of the transmitting unit or the receiving unit from the acoustic emitter. The system also includes a processor that determines a vector direction and a range between the receiving unit and the transmitting unit based on the received optical and acoustic signals.

In another aspect, a method for determining a vector between a receiving unit and an emitter unit includes receiving, at a receiving unit that includes at least four photodetector cells with an aperture, a first optical signal from a point-source-like emitter attached to a first emitter unit. The method includes analyzing the pattern on the array of light intensity of the received optical signal from the emitter, and determining a first coordinate of the vector by determining a difference in light intensity received at a first grouping of cells in the array and at a second grouping of cells in the array. The method further includes determining a second coordinate of the vector by determining a difference in light intensity received at a third grouping of cells in the array and a fourth grouping of cells in the array.

In another aspect, a tracking system includes a receiving unit that has an array of at least four photodetector cells with an aperture. The system also includes a first point-source-like emitter and a data processing unit. The data processing unit is adapted to analyze the pattern on the array of light intensity of a received first optical signal from the first emitter. The data processing unit determines a first coordinate of a vector between the receiving unit and the first emitter by determining a difference in light intensity received at a first grouping of cells in the array and at a second grouping of cells in the array. The data processing unit further determines a second coordinate of the vector by determining a difference in light intensity received at a third grouping of cells in the array and a fourth grouping of cells in the array.

Implementations may include one or more of the following features.

The aperture can be substantially equal in size to one of the photodetector cells. For example, the aperture can be square and positioned to expose substantially equal portions of the photodetector cells. The optical sensor can include a filter for filtering light admitted onto the surface of the photodetector cells. For example, the filter can be an infrared pass filter. The optical sensor can have the opaque mask to be printed on the filter. The optical sensor can include circuitry for calculating at least two orthogonal bearing angles to a source of light admitted onto the surface of the photodetector cells.

The array of photodetectors can include a first, a second, a third, and a fourth photodetector. The optical sensor can determine first and second bearing angles between the sensor and an optical source, where the first bearing angle is determined based on the difference between the sum of the output of the first and third photodetectors and the sum of the second and fourth photodetectors. The second bearing angle is determined based on the difference between the sum of the first and second photodetectors and the sum of the third and fourth photodetectors. At least two orthogonal bearing angles of a source of light admitted onto the surface of the photodetector cells can be calculated. The optical sensor can include a decoder for decoding encoded optical signals received at said sensor. In some implementations, the optical sensor can lack an image sensor and an image processor.

The array of photodetectors can simultaneously receive the first optical signal and a second optical signal from a point-source-like emitter attached to a second emitter unit.

The second optical signal can be distinguished from the first optical signal using a multiple access scheme selected from the group of time-division-multiple-access, code-division-multiple-access and frequency-division-multiple-access. Based on the distinguished second optical signal, a vector between the receiving unit and the second emitter unit can be determined. A range from the receiving unit to the first emitter unit can be determined by calculating an ultrasonic time of flight based on an ultrasonic signal received from the first emitter unit and the first optical signal.

The tracking system can include a second point-source-like emitter. The data processing unit can be adapted to distinguish a second optical signal received from the second emitter from the optical signal received from the first emitter using a multiple access scheme selected from the group of time-division-multiple-access, code-division-multiple-access and frequency-division-multiple-access. Based on the distinguished second optical signal, a vector between the receiving unit and the second emitter can be determined.

DETAILED DESCRIPTION

In acoustic and optical tracking systems, the accuracy of the determined position and/or orientation depends on the spatial diversity of fixed reference devices, which are spread around and surround a tracking volume to achieve a low geometric dilution of precision (GDOP). The GDOP is the ratio of the computed position standard deviation to the standard deviation of the individual range measurements from which the position is computed. The GDOP approaches a minimum of 1 when lines from a tracked object to the fixed reference devices are approximately orthogonal. To secure this low GDOP throughout the desired tracking volume, a large number of reference devices are installed around the workspace so that the system can choose a suitable subset to provide an effective geometry.

In some implementations, the disclosed techniques can reduce the cost and complexity of optical or acoustic tracking systems. This can be achieved, for example, by eliminating a large structure needed to hold all reference devices at precisely known positions. In addition, the cost and complexity can be reduced by avoiding a labor-intensive installation and surveying procedure that may be required to calibrate the positions of reference devices.

In some implementations, a tracking system can include two compact electronic modules, a VectorSense emitter (VSE) and a VectorSense receiver (VSR). Each of these modules can be configured in several different build variants to achieve different numbers of degrees of freedom measurement between the two modules.

Figure 1:
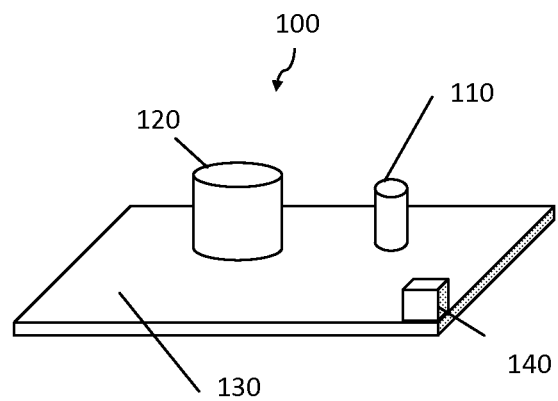
FIG. 1 is a schematic of an example of a VectorSense emitter (VSE) module.

In some implementations, the tracking system supports a 3-DOF measurement of a translation vector from a VSR to a VSE. The VSR and the VSE can be a receiving unit and a transmitting unit, respectively. In the example illustrated in FIG. 1, a VSE 100 includes an optical emitter 110 and an acoustic emitter 120 mounted on a printed circuit board 130. The VSE 100 can be referred as VSE-OA where O and A indicates optical and acoustic emitter, respectively. The optical emitter 110 can be a point-source-like emitter. For example, the optical emitter 110 can emit light at infra-red or other wavelengths. In some implementations, the optical emitter 110 can be an LED. The acoustic emitter 120 can emit ultrasonic waves or acoustic waves at other frequencies. The VSE 100 is driven by a circuit 140 which from time to time causes the optical emitter 110 and/or the acoustic emitter 120 to emit signals. In some implementations, the start times at which the optical emitter 110 and the acoustic emitter 120 begin emitting signals, are synchronized. For example, the start times can coincide or have a fixed predetermined delay time in between. In some implementations, the VSE 100 can be completely autonomous in which the VSE 100 emits synchronized optical and acoustic signals from time to time independent of an external signal. The VSE 100 can also be triggered by an external signal so that the emission times of the optical and acoustic signals can be coordinated with other VSEs, for example, to avoid interference.

Figure 2:
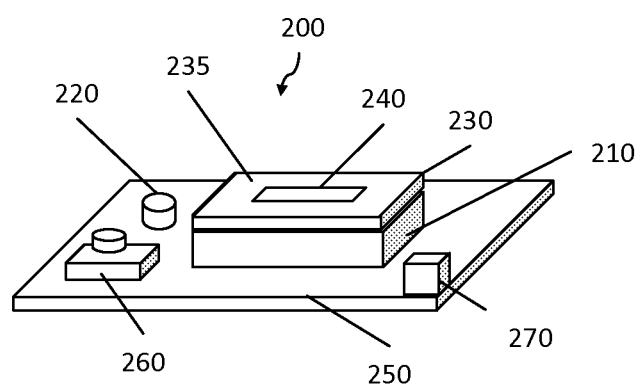
FIG. 2 is a schematic of an example of a VectorSense receiver (VSR) module.

In the example illustrated in FIG. 2, a VSR 200 (also referred as VSR-3) that supports a 3-DOF measurement mode includes a printed circuit board 250 on which is mounted an acoustic receiver 220 (e.g., a microphone) to detect the arrival time of acoustic signals (e.g. acoustic pulses) from the acoustic emitter 120. The VSR 200 also includes an electro-optical sensor 210 which can measure at least two bearing angles to a target optical emitter 110. For example, the two bearing angles can be orthogonal. The printed circuit board 250 can also include additional circuitry 270 such as one or more amplifiers, signal processing circuitry, detection circuitry, a decoder, and a data processing unit, including circuitry for performing any of the data processing steps described herein. The entire printed circuit board 250 may be mounted, e.g., on or in a handheld or head-mounted device. The electro-optical sensor 210 can be a lateral-effect photodiode (also known as position-sensitive detector), which outputs signals in accordance with the horizontal and vertical displacements of a light spot on its surface. In some implementations, the electro-optical sensor 210 can include a rectangular array of at least four photo-detector cells of substantially equal size. For example, the electro-optical sensor 210 can be a quad photodiode array (also referred as a quad-cell), such as the Hamamatsu S5980/S5981, which has four square elements with narrow gaps in between and outputs four signals in accordance with the amount of light falling on each quadrant. In some implementations, electro-optical sensor 210 can be used without a lens. The electric-optical sensor 210 can be used with an aperture 240 which can be substantially rectangular in shape and allows a spot of light to fall on the sensor surface. The aperture 240 can be centrally positioned over the rectangular array. Because of the distance between the sensor surface and the aperture, the light spot displacement can be, for example, substantially proportional to the bearing angles to the light source. In some implementations, the aperture 240 can include a bandpass filter 230, for example, an infra-red bandpass filter.

In some implementations, a bandpass filter 230 with a passband matched to the wavelength of light emitted from the optical emitter 110 can be glued to the front surface of the electro-optical sensor 210 with an optically transparent adhesive. An aperture 240 can be formed by an opaque mask 235 centered over the sensor. The mask 235 can be printed or adhered on the outside surface of the bandpass filter 230. The aperture 240 can be substantially rectangular or round. For example, the aperture 240 can be square. In some implementations, the aperture 240 can result in a substantially linear relationship between the displacement of the optical emitter 110 at a constant distance (i.e., tangent of angle-of-incidence) and a differential signal from the electro-optical sensor 210.

In some implementations, the electro-optical sensor 210 can be a rectangular array of at least four photodetector cells that include a first, a second, a third, and a fourth detector. The electro-optical sensor 210 can determine first and second bearing angles between the sensor 210 and the optical emitter 110. For example, the first bearing angle can be determined based on the difference between the sum of the output of the first and third photodetectors and the sum of the second and fourth photodetectors. The second bearing angle can be determined based on the difference between the sum of the first and second photodetectors and the sum of the third and fourth photo detectors.

In some implementations, thickness of the bandpass filter 230 can be chosen to make the gap between the photodetector cell surfaces and the mask 235 of aperture 240 to be slightly less than the size of one cell of the four photodetector cells, and the aperture 240 can be substantially equal to the size of one cell of the four photodetector cells. With this geometry, the light spot, when centered, can be overlapped with one quarter of each cell of the photodetector cells, and the field-of-view (FOV) over which the linear response characteristic holds can be slightly more than +/−45 degrees in both the horizontal and vertical directions. This amount of FOV can be advantageous for many applications, and allows for panoramic coverage with no gaps by mounting multiple VSRs at right angles. The FOV can be made larger by reducing the space between the photodetector cells and the aperture 240 (equivalent to pinhole camera focal length).

In this case, the signal strength at the periphery is reduced by cosine of the angle of incidence, so the signal-to-noise ratio and thus the angular measurement resolution decreases as the FOV expands beyond 45 degrees.

In some implementations, a bandpass filter 230 can be made from a lamination of two or more identical or different types of filter glass. This can provide the advantage of having no lens and no air spaces between the electro-optical sensor 210 and the outer window in which condensation could form. A conventional lens can also be used to form the light spot to gather more light onto the electro-optical sensor 210 leading to higher sensitivity.

In some implementations, a VSR 200 may optionally include a remote control receiver 260 such as the Vishay TSOP351xx which can be used to wake up the circuit when the infra-red optical emitter 110 begins transmission. For example, infra-red light can be transmitted from the optical emitter 110 and received by the remote control receiver 260. Such a receiver can operate on low supply current (e.g., 0.35 mA) which is less than that required for some high-gain low-noise transimpedance amplifiers for photodetector cells.

In some implementations, to perform a measurement cycle and determine a 3-DOF vector from a VSR 200 to a VSE 100, the following steps can be performed by the VSE 100:

1. An optical emitter 110 transmits a first wake-up signal using a relatively low carrier frequency, for example, in the 36-56 KHz range for compatibility with consumer infra-red receiver (CIR) remote control modules.

2. The VSE 100 waits a short delay to give the VSR 200 time to wake up and stabilize.

3. The optical emitter 110 transmits a short measurement type code to alert the VSR 200 as to which type of measurement operation can be performed.

4. The optical emitter 110 transmits a first synchronization signal.

5. Simultaneously (or with a predetermined fixed lag after the sync signal), the VSE 100 starts to drive an acoustic emitter 120 (e.g., ultrasonic transducer) with a short train of pulses to produce a distinctive burst waveform of any type suitable for accurate time-of-flight ranging.

6. The optical emitter 110 transmits a distinctive predetermined optical tracking waveform signal designed to provide accurate detection and amplitude measurement by a quad photodetector array with high signal-to-noise ratio despite any ambient lighting interference. This signal may be at a higher carrier frequency of several hundred kHz to make it more distinguishable from background lighting fluctuations. The signal can be, for example, an on/off square wave (to facilitate a lock-in amplifier detection strategy in the VSR 200), or a pseudo-random code (to facilitate a matched filter detection strategy in the VSR 200).

7. Optionally, the VSE 100 may transmit a first data packet. The first data packet can include elements such as a) packet type identifier, b) packet length, c) data payload, and d) checksum. The packet may be transmitted at a high carrier frequency and received by the quad photodetector array, or at a low carrier frequency and received by the CIR remote control module.

8. The VSE 100 goes to sleep for a predetermined period of time (or until activated by an external trigger signal), then returns to step 1.

To perform a measurement cycle and determine the 3-DOF vector from the VSR 200 to VSE 100, the following steps can be performed by the VSR 200:

1. The VSR 200 powers on the photodetector amplifiers and signal processing circuitry and wakes up its microprocessor upon receiving a wake-up signal from the VSE 100.

2. The VSR 200 monitors a signal related to the sum of all four photodetector cells to find a triggering edge of the first synchronization signal.

3. Upon receipt of the first synchronization signal, the VSR 200 starts a counter for measuring the acoustic (e.g., ultrasonic) time-of-flight.

4. At a predetermined phase following the first synchronization signal, the VSR 200 begins to demodulate and quantify the strength of the optical tracking waveform in each quadrant. For example, this can be done using four matched-filter correlators, or four lock-in amplifier detectors.

5. The VSR 200 analyzes the pattern on the photodetector array of the light intensity of the received signal, for example, by the included data processing unit. Using the four relative amplitude measurements, the VSR 200 calculates a first coordinate (u) by determining a difference in light intensity received at a first grouping of cells and a second grouping of cells in the photodetector array. The VSR 200 further calculates a second coordinate (v) by determining a difference in light intensity received at a third grouping of cells and a fourth grouping of cells in the photodetector array. For example, the first and second coordinates can be determined according to the linear approximation formulas: $u=(A+C)-(B+D)$, $v=(A+B)-(C+D)$, where A, B, C and D can be signal amplitudes measured in the first, second, third, and fourth photodetector of the four photodetector cells, respectively.

6. The VSR 200 calculates compensation factors to add to u and v in order to compensate for any imperfections in the linear approximation due to unequal sensitivity of the four quadrants in the photodetector cells or their respective amplifiers, imperfect centering of an aperture 240 over the photodetector cells, rotation or printing errors of the aperture 240, or non-orthographic projection causing the image of the aperture 240 to be not perfectly square when the optical emitter 110 is too close to the photodetector cells.

7. During step 4, the VSR 200 can capture time stamps of any acoustic (e.g., ultrasonic) arrival signals or components thereof (such as zero-crossings). This can be done using short interrupt service routines to minimize impact on the demodulation of the optical tracking waveform signal.

8. The VSR 200 analyzes acoustic (e.g., ultrasonic) arrival timestamps to determine the time of arrival of the beginning of the acoustic waveform, and calculates the distance from the measured time-of-flight and the speed of sound.

9. Optionally, the VSR 200 can decode and output a second data packet.

In one transaction cycle between the VSE 100 and the VSR 200, an acoustic range is determined between the acoustic emitter 120 and the acoustic receiver 220, and a 2-D bearing angle measurement is made from the center of the aperture 240 of the photodetector cells to the source (i.e., optical emitter 110). When the distance between the VSE 100 and the VSR 200 modules is substantially larger than separations between the acoustic and optical elements on each module (or than the size of the boards of each module), the measurement approximates a 3-DOF vector measurement. In some implementations, other sensors such as inertial sensors or additional optical or acoustic sensors can be included in the tracking system to derive a full 6-DOF pose information leading to the compensation of any errors due to the non-zero size of the boards of the included modules.

Alternative Embodiment for Measuring 1-DOF Range

Figure 3:
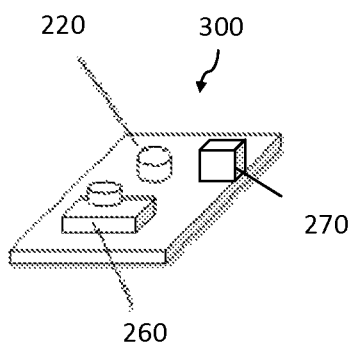
FIG. 3 is a schematic of an example of a VSR module.

In some implementations, it can be desirable to use simplified hardware which can only measure the range, i.e., distance between a VSE and a VSR. For example, the VSE can be substantially similar to the VSE 100 shown in FIG. 1 and the VSR can be substantially similar to the VSR 300 (also referred as VSR-1) as illustrated in the example in FIG. 3. The VSR 300 is similar to a VSR 200 but does not include an electro-optical sensor 210 and associated optics and circuitry. The VSR 300 can be a smaller and cheaper module than the VSR 200.

In some implementations, a 1-DOF range measurement can include using an emission sequence for a VSE 100 which is substantially the same as previously described for a 3-DOF measurement cycle. Alternatively, the sequence can be modified to omit the specialized optical tracking step. In some implementations, the operation of a VSR 300 can include the following steps:

1. The VSR 300 wakes up upon receipt of a wake-up signal such as a pulse from the VSE 100 if using power saving sleep mode between measurement cycles.

2. The VSR 300 detects a synchronization signal and begins counting.

3. The VSR 300 can capture time stamps of acoustic (e.g., ultrasonic) burst arrival and calculates the distance.

4. Optionally, the VSR 300 can decode and output a data packet.

Alternative Embodiment for Measuring 2-DOF Bearing Angles

Figure 4:
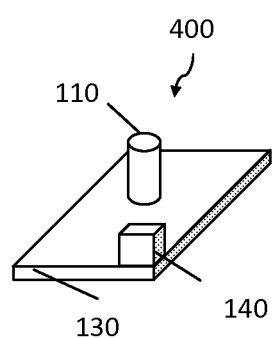
FIG. 4 is a schematic of an example of a VSE module.
Figure 5:
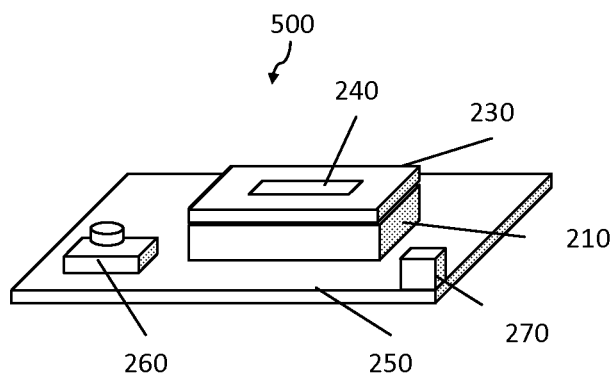
FIG. 5 is a schematic of an example of a VSR module.

In some implementations, it can be desirable to avoid using acoustic ranging (due to ambient acoustic noise sources) or it may be sufficient to measure the bearing angles. In such cases, the configuration of both a VSE and a VSR can be simplified by omitting acoustic elements. For example, FIG. 4 shows a VSE 400 without an acoustic emitter 120. As another example, FIG. 5 shows a VSR 500 without an acoustic receiver 220.

Alternative VSE Embodiments With Multiple Optical Emitters

Figure 6:
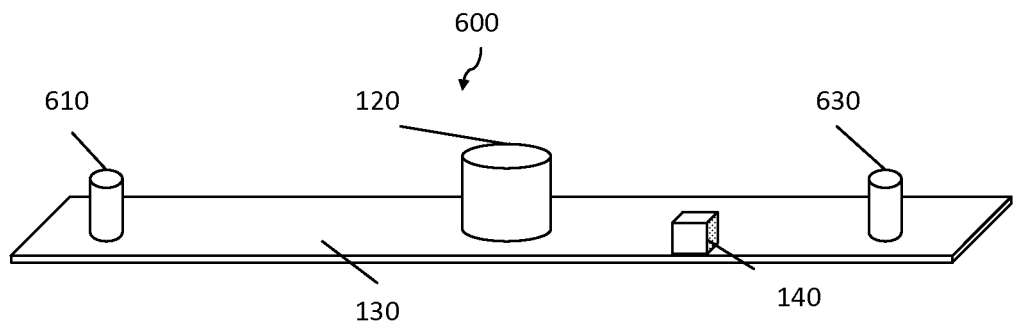
FIG. 6 is a schematic of an example of a VSE module.

In some implementations, a VSE can be used in conjunction with a VSR-3 to measure 5 constraints per measurement cycle (one range and two sets of 2D bearing angles). In the example illustrated in FIG. 6, a VSE 600 (also referred as VSE-$O^2A$) is designed to have a long and thin dimension in order to provide baseline separation between an optical emitter 610 and an optical emitter 630. Even when the baseline separation is small compared to the distance from the VSE 600 to the VSR-3, the tracking system may provide sufficient resolution of the "twist" between the VSR 600 and the VSE-3 around the axis connecting the two modules.

In some implementations, a VSE can include more than two optical emitters 110. When the VSE includes more than one acoustic emitter 120, the configuration is referred as VSE-$O^nA$ where n is the number of included optical emitters 110. When the VSE does not include any acoustic emitter 120, the configuration is referred as VSE-$O^n$ where n is the number of included optical emitters 110. A complete 6-DOF pose recovery from one measurement cycle using a PnP algorithm can be performed with the inclusion of four or more non-collinear optical emitters 110 in the configuration of the VSE.

In some implementations, a single VSE can be configured to include multiple optical emitters. In such configurations, the optical tracking waveform portion of the light emission (e.g. infra-red emission) can be modified to allow a VSR to separately measure the signal strength from each optical emitter to each photodetector cell. This can be achieved by activating the optical emitters in a round-robin cycling through n+1 phases including one phase which has all the optical emitters 110 powered off. The demodulator for each optical emitter 110 can measure the difference between the photodiode signals during the on and off phases for that optical emitter. Alternatively, the optical emitters can each transmit optical tracking waveforms simultaneously using orthogonal pseudo-random codes. An analysis can be performed to determine what signal structure and detection algorithm leads to the highest signal-to-noise ratio (and within an acceptable decode time) for a given optical emitter.

In some implementations, a VSE emits at least one measurement type code before emitting a synchronization signal and an optical tracking waveform in order to inform any VSRs that may be in range to receive the signals. The at least one measurement type code can include, for example, information on the number of optical emitters, the type of optical tracking waveform emitted by the optical emitters, and whether the VSE includes at least one acoustic emitter. The measurement type code can be received by VSRs within a given range.

Integration With Inertial Sensors and Sensor Fusion Algorithms

Figure 7:
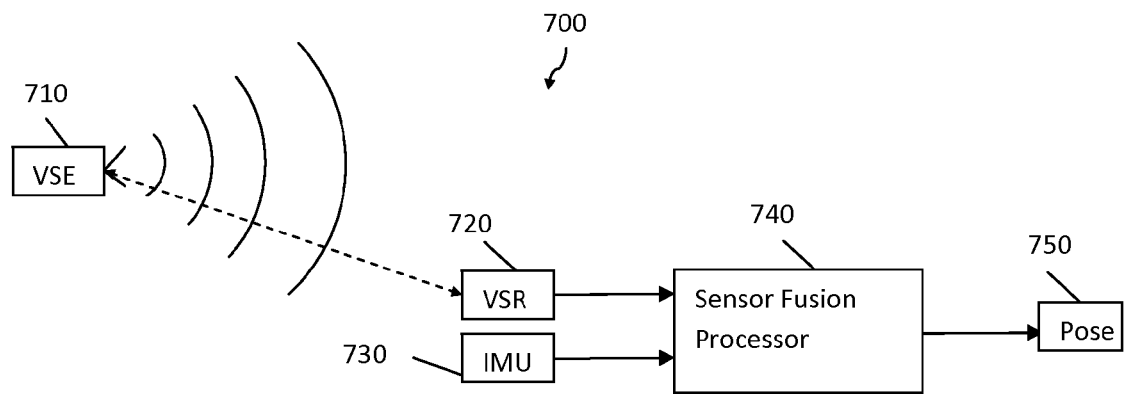
FIG. 7 is an example of an "inside-out" system.

In some implementations, range and/or bearing measurements made by one or more VSRs can be combined with inertial sensor data to determine pose over time. For example, this can be achieved using the methods described in U.S. Pat. No. 6,922,632 "Tracking, Auto-Calibration, and Map-Building System," the content of which is incorporated herein by reference. In the example illustrated in FIG. 7, a sensor fusion system 700 includes a VSE 710, VSR 720, inertial measurement unit (IMU) 730, and sensor fusion processor 740. In some implementations, the VSR 720, IMU 730, and sensor fusion processor 740 may all be mounted on or in a single handheld object. In some implementations, the VSE 710 can be substantially similar to any of the VSE's described above with reference to FIG. 1, FIG. 4, or FIG. 6. Measurements made using the VSR 720 and the VSE 710 can include obtaining two bearing angles u and v (from the electro-optical sensor 210 of the VSR 720 to the optical emitter 110 of the VSE 710) and/or the distance between an acoustic emitter 120 on the VSE 710 and an acoustic receiver 220 on the VSR 720. The sensor fusion processor 740 can be a data processing unit. The sensor fusion system 700 can be referred to as an "inside-out" system because at least one sensor is on the moving object (also referred as a "vehicle") and looking "outward" towards fixed beacons in the environment. The vehicle can be a small object such as a wand or headset. The IMU 730 can constrain the pitch and roll of the vehicle. Combining this information with a measured 3-DOF vector to the VSE 710, only one degree of freedom corresponding to a rotation around the vertical line through the VSE 710 is unconstrained. Drift around this axis can cause coordinated changes along two mutually orthogonal reference axes (referred to as x and y) and in the yaw of the vehicle as a computed pose 750 drifts in a circle even while the vehicle is sitting still. In some implementations, the VSR 720 can include a bearing sensor and image two points which may be either two optical emitters on a single VSE or on two separate VSEs. In this configuration, the yaw can be resolved and the 6-DOF pose 740 can be obtained. The resolution of the determination of the yaw is related to the horizontal baseline separation of the two optical emitters and also the viewing angle from the VSR 720 to the single VSE or two VSEs. High resolution can be achieved when the VSR 720 is directly over the single or two VSEs.

When an "inside-out" system is employed, the sensors and means to process data are typically on a mobile object. The environment contains only autonomous beacons, which eliminates the need for any form of wireless data communication other than the ID code and optionally position of the emitting beacon.

In some implementations, more than one VSEs can be distributed in the environment, and known methods of multiple access can be employed to prevent mutual interference. For example, any of the following methods can be used:

A. Code-division multiple access (CDMA): VSEs in the same area all transmit different and mutually orthogonal codes.

B. Frequency-division multiple access (FDMA): VSEs in the same area are modulated at different frequencies.

C. Time-division multiple access (TDMA): VSEs in the same area are scheduled not to emit at the same time. This can be accomplished with a wired or wireless control network to regulate emission times, or the VSEs could be equipped with an optical sensor to detect emissions from other VSEs and then wait a predetermined or random delay time to avoid collisions.

D. Space-division multiple access (SDMA): VSEs can be arranged so that there is no overlap of their emitted signal beams if they are only used to provide occasional updates to some form of dead-reckoning or inertial navigation system. It does not matter if the VSEs are emitting at the same time on the same channel.

When the VSE and VSR include one or more acoustic emitter and receivers, the bandwidth of the acoustic transmission may be relatively narrow, and TDMA or SDMA may be preferred over CDMA or FDMA.

Figure 8:
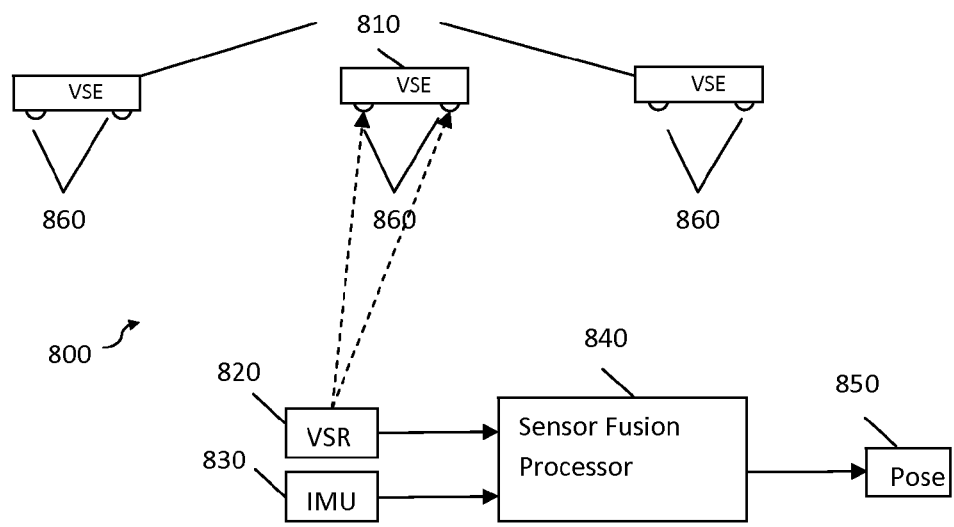
FIG. 8 is an example of an "inside-out" system including multiple VSE-$O^2$.

In the example illustrated in FIG. 8, a wide-area system 800 for tracking personnel through a facility includes one or more VSEs 810, a VSR 820, a foot-mounted IMU 830, and a sensor fusion processor 840 which provides the computed pose 850. The tracking system provides fixed positions when the IMU 830 integrated with the VSR 820 passes by the one or more VSEs 810. For example, the VSE 810s can be one or more VSE-$O^2$s, each having two spatially spaced optical emitters 860. The sensor fusion processor 840 can be a data processing unit.

In some implementations, the "inside-out" system can be advantageous in wide-area applications due to the autonomous operation and low cost of the included VSEs 810. In such implementations, a simple infrastructure can be achieved by spreading out the VSEs 810 and relying only on SDMA to prevent collisions. The VSEs 810 can be equipped with a sensor to detect whether there are any VSRs 820 in the vicinity, and to power off when not needed.

Figure 9:
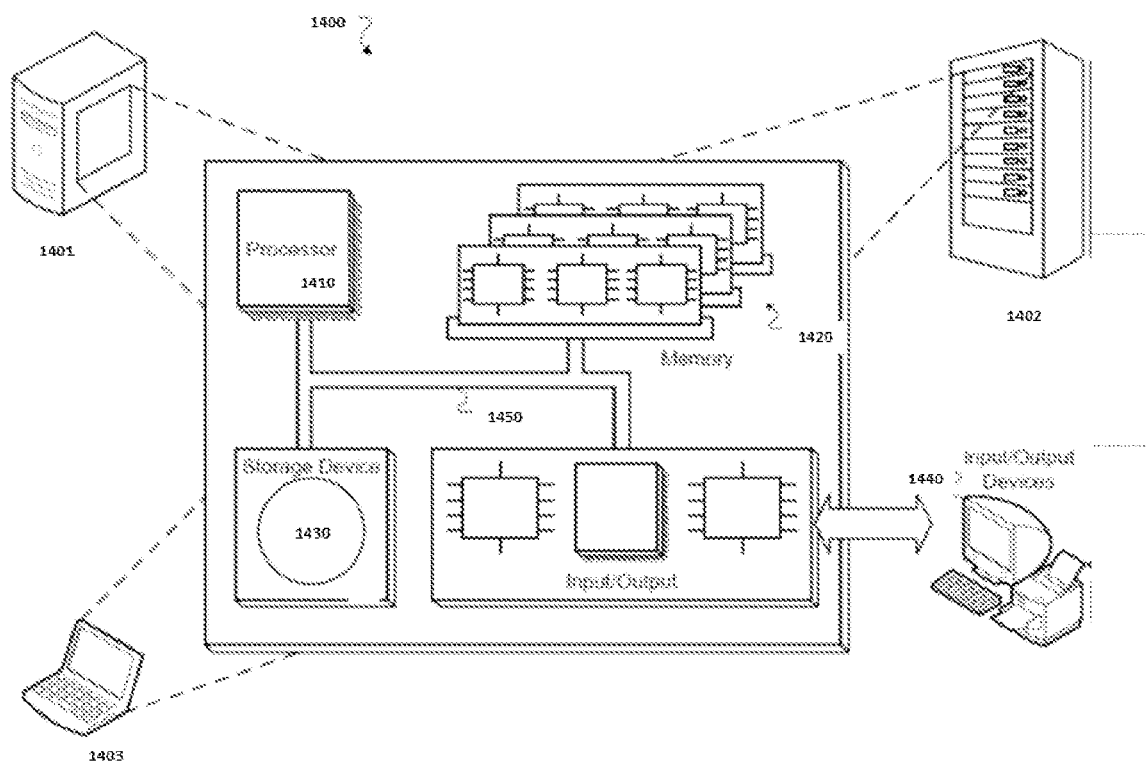
FIG. 9 is an example of a computing device.

In some embodiments, any of the data processing steps described above may be implemented in a computer system. FIG. 9 is a schematic diagram of a computer system 1400. The system 1400 can be used for the operations described in association with any of the data processing methods described above. The system 1400 can be incorporated in various computing devices such as a desktop computer 1401, server 1402, and/or a mobile device 1403 such as a laptop computer, mobile phone, tablet computer or electronic reader device, or it may be integral with any of the VSE or VSR devices described above. The system 1400 includes a processor 1410, a memory 1420, a storage device 1430, and an input/output device 1440. Each of the components 1410, 1420, 1430, and 1440 are interconnected using a system bus 1450. The processor 1410 is capable of processing instructions for execution within the system 1400. In one implementation, the processor 1410 is a single-threaded processor. In another implementation, the processor 1410 is a multi-threaded processor. The processor 1410 is capable of processing instructions stored in the memory 1420 or on the storage device 1430 to display graphical information for a user interface on the input/output device 1440. In some implementations, the processor 1410 is a mobile processor that is designed to save power.

The memory 1420 stores information within the system 1400. In some implementations, the memory 1420 is a computer-readable storage medium. The memory 1420 can include volatile memory and/or non-volatile memory. The storage device 1430 is capable of providing mass storage for the system 1400. In one implementation, the storage device 1430 is a computer-readable medium. In various different implementations, the storage device 1430 may be a floppy disk device, a hard disk device, an optical disk device, a tape device, or non-volatile electronic memory.

The input/output device 1440 provides input/output operations for the system 1400. In some implementations, the input/output device 1440 includes a keyboard and/or pointing device. In some implementations, the input/output device 1440 includes a display unit for displaying graphical user interfaces. In some implementations the input/output device can be configured to accept verbal (e.g. spoken) inputs.

The features described can be implemented in digital electronic circuitry, or in computer hardware, firmware, or in combinations of these. The features can be implemented in a computer program product tangibly embodied in an information carrier, e.g., in a machine-readable storage device, for execution by a programmable processor; and features can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program includes a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Computers include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display) monitor, e-Ink display or another type of display for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them.

The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

The processor 1410 carries out instructions related to a computer program. The processor 1410 may include hardware such as logic gates, adders, multipliers and counters. The processor 1410 may further include a separate arithmetic logic unit (ALU) that performs arithmetic and logical operations.

Although a number of implementations have been described with reference to the figures, other implementations are possible. Various modifications may be made without departing from the spirit and scope of the present disclosure. For example, advantageous results may be achieved if the steps of the disclosed techniques are performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope of the following claims.

What is claimed is:

1. An optical sensor comprising:
   a. a rectangular array of at least four photodetector cells of substantially equal size;
   b. an opaque mask affixed over said array, said opaque mask defining a substantially rectangular aperture centrally positioned over said at least four photodetector cells for admitting light onto only a portion of the surface of each of said at least four photodetector cells,
   wherein the optical sensor is configured to determine a bearing angle to a source of the light admitted through the aperture based on a difference in light intensity received at the at least four photodetector cells.

2. An optical sensor according to claim 1, wherein said aperture is substantially equal in size to one of said photodetector cells.

3. An optical sensor according to claim 2, further comprising a filter for filtering light admitted onto the surface of said photodetector cells.

4. An optical sensor according to claim 1, further comprising circuitry for calculating at least two orthogonal bearing angles to the source of light admitted onto the surface of said photodetector cells.

5. The optical sensor of claim 2, wherein said aperture is square.

6. The optical sensor of claim 3, wherein said opaque mask is printed on said filter.

7. The optical sensor of claim 3, wherein said filter is an infra-red pass filter.

8. The optical sensor of claim 1, wherein said aperture is positioned to expose substantially equal portions of said photodetector cells.

9. The optical sensor of claim 1, wherein said array of photodetectors comprise a first, a second, a third, and a fourth photodetector, and wherein said optical sensor determines first and second bearing angles between the sensor and an optical source, wherein said first bearing angle is determined based on the difference between the sum of the output of the first and third photodetectors and the sum of the second and fourth photodetectors and wherein said second bearing angle is determined based on the difference between the sum of said first and second photodetectors and the sum of said third and fourth photodetectors.

10. A method for determining the direction of a point-source-like emitter of light comprising:
   a. providing a rectangular array of at least four photodetector cells of substantially equal size and an opaque mask affixed over said array, said opaque mask defining a substantially rectangular aperture for admitting light onto only a portion of the surface of each of said at least four photodetector cells, wherein said aperture is centrally positioned over said rectangular array; and
   b. determining a bearing angle of a source of light admitted through the aperture onto the surface of said photodetector cells comprising analyzing the intensity of light received on said array from said point-source-like emitter in order to determine a difference in light intensity received at the at least four photodetector cells.

11. The method of claim 10, wherein said aperture is substantially equal in size to one of said photodetector cells.

12. The method of claim 11, further comprising providing a filter for filtering light admitted onto the surface of said photodetector cells.

13. The method of claim 10, further comprising calculating at least two orthogonal bearing angles of the source of light admitted onto the surface of said photodetector cells.

14. The method of claim 11, wherein said aperture is square.

15. The method of claim 12, wherein said opaque mask is printed on said filter.

16. The method of claim 12, wherein said filter is an infra-red filter.

17. The method of claim 10, wherein said aperture is positioned to expose substantially equal portions of said photodetector cells.

18. The method of claim 10, wherein said array of photodetectors comprise a first, a second, a third, and a fourth photodetector, and further comprising determining first and second bearing angles between the array of photodetectors sensor and an optical source, wherein said first bearing angle is determined based on the difference between the sum of the output of the first and third photodetectors and the sum of the second and fourth photodetectors and wherein said second bearing angle is determined based on the difference between the sum of said first and second photodetectors and the sum of said third and fourth photodetectors.

19. A tracking system comprising:
   a. a transmitting unit comprising an optical emitter;
   b. a receiving unit comprising an optical sensor adapted to receive signals from said optical emitter, the optical sensor comprising a rectangular array of at least four photodetector cells and an opaque mask having a central rectangular aperture for admitting light onto a portion of the surface of each of said at least four photodetector cells, wherein the optical sensor is configured to determine a bearing angle to a source of the admitted light through the aperture based on a difference in light intensity received at the at least four photodetector cells;
   a. an acoustic emitter mounted on said transmitting unit or said receiving unit;
   b. an acoustic receiver mount on a different one of said transmitting unit or said receiving unit from said acoustic emitter; and
   c. a processor that determines a vector direction and a range between the receiving unit and the transmitting unit based on said received optical and acoustic signals.

20. The optical sensor of claim 1 further comprising a decoder for decoding encoded optical signals received at said sensor.

21. The optical sensor of claim 20, wherein said optical signals are received through a rectangular array.

22. The optical sensor of claim 1, wherein said optical sensor system lacks an image sensor and an image processor.

23. A method for determining a vector between a receiving unit and an emitter unit comprising:
   a. receiving, at a receiving unit comprising an array of at least four photodetector cells with an aperture, a first optical signal from a point-source-like emitter attached to a first emitter unit;
   b. analyzing a pattern on the array of light intensity of the received optical signal from the emitter;
   c. determining a first coordinate of said vector by determining a difference in light intensity received at a first grouping of cells in said array and at a second grouping of cells in said array; and
   d. determining a second coordinate of said vector by determining a difference in light intensity received at a third grouping of cells in said array and a fourth grouping of cells in said array.

24. The method of claim 23, further comprising:
   a. simultaneously with receiving said first optical signal, receiving, at said array, a second optical signal from a point-source-like emitter attached to a second emitter unit;
   b. distinguishing said second optical signal from said first optical signal using a multiple access scheme selected from the group of time-division-multiple-access, code-division-multiple-access and frequency-division-multiple-access; and
   c. determining a vector between said receiving unit and said second emitter unit based on said distinguished second optical signal.

25. The method of claim 23, further comprising determining a range from said receiving unit to said first emitter unit by calculating an ultrasonic time of flight based on an ultrasonic signal received from said first emitter unit and said first optical signal.

26. A tracking system comprising:
   a. a receiving unit comprising an array of at least four photodetector cells with an aperture;
   b. a first point-source-like emitter;
   c. a data processing unit adapted to analyze a pattern on the array of light intensity of a received first optical signal from said first emitter, and to determine a first coordinate of a vector between said receiving unit and said first emitter by determining a difference in light intensity received at a first grouping of cells in said array and at a second grouping of cells said array, and to determine a second coordinate of said vector by determining a difference in light intensity received at a third grouping of cells in said array and a fourth grouping of cells in said array.

27. The system of claim 26, further comprising a second point-source-like emitter, wherein said data processing unit is adapted to distinguish a second optical signal received from said second emitter from said first optical signal received from said first emitter using a multiple access scheme selected from the group of time-division-multiple-access, code-division-multiple-access and frequency-division-multiple-access, and to determine a vector between said receiving unit and said second emitter based on said distinguished second optical signal.

\* \* \* \* \*